(12) United States Patent
Witchey

(10) Patent No.: US 6,698,256 B2
(45) Date of Patent: Mar. 2, 2004

(54) BALL AND RING HITCH LOCK

(76) Inventor: Bryan Witchey, 209 Fairway Cir., Cross Junction, VA (US) 22625

( * ) Notice: Subject to any disclaimer, the term of this patent is extended or adjusted under 35 U.S.C. 154(b) by 0 days.

(21) Appl. No.: 10/384,647

(22) Filed: Mar. 11, 2003

(65) Prior Publication Data

US 2003/0167806 A1 Sep. 11, 2003

Related U.S. Application Data

(60) Provisional application No. 60/363,272, filed on Mar. 11, 1992.

(51) Int. Cl.[7] .......................... B60R 25/00; E05B 73/00
(52) U.S. Cl. .................. 70/14; 70/58; 70/237; 70/258; 280/507
(58) Field of Search .................. 70/14, 18, 19, 70/58, 258, 237, 232, 234, 235; 248/551, 552, 553; 280/507, 511, 513

(56) References Cited

U.S. PATENT DOCUMENTS

| 1,635,711 A | * | 7/1927 | Fraim | |
| 3,631,694 A | * | 1/1972 | Teroux | 70/202 |
| 4,032,171 A | * | 6/1977 | Allen et al. | 280/507 |
| 4,571,964 A | * | 2/1986 | Bratzler | 70/58 |
| 4,774,823 A | * | 10/1988 | Callison | 70/14 |
| 5,087,064 A | * | 2/1992 | Guhlin | 280/507 |
| 5,094,423 A | * | 3/1992 | Almquist et al. | 248/552 |
| 5,584,495 A | * | 12/1996 | Mason | 280/507 |
| 5,873,271 A | * | 2/1999 | Smith | 70/58 |
| 5,908,201 A | * | 6/1999 | Van Vleet | 280/511 X |
| 6,070,441 A | * | 6/2000 | Bernstrom | 70/58 |
| 6,393,874 B1 | * | 5/2002 | Zapushek et al. | 70/14 |
| 6,406,052 B1 | * | 6/2002 | Bale | 280/507 |

FOREIGN PATENT DOCUMENTS

| FR | 2570991 | * | 4/1986 | 280/511 |
| FR | 2681823 | * | 4/1993 | 70/19 |
| GB | 1206333 | * | 9/1970 | 70/14 |

* cited by examiner

*Primary Examiner*—Lloyd A. Gall
(74) *Attorney, Agent, or Firm*—Richard C. Litman

(57) ABSTRACT

A ball and ring hitch lock to reversibly obstruct a ball socket or ring of a trailer hitch in order to prevent the theft of an unhitched trailer. The ball and ring hitch lock comprises an upper plate and a base plate attached by means of a secure rachet type system. A male hitch anchor is attached to the base plate. The male hitch anchor is sized to fit into a ball or a ring type hitch.

10 Claims, 6 Drawing Sheets

BALL AND RING HITCH LOCK

CROSS-REFERENCE TO RELATED APPLICATION

This application claims the benefit of U.S. Provisional Patent Application Serial No. 60/363,272, filed Mar. 11, 2002.

BACKGROUND OF THE INVENTION

1. Field of the Invention

The present invention relates generally to anti-theft devices. More specifically, the invention is a ball and ring hitch lock to prevent unauthorized control and use of a trailer, particularly an unhitched trailer, with either a ball or ring type hitch.

2. Description of the Related Art

Trailers, such as boat carrying trailers, utility trailers, construction equipment trailers, military trailers, and camping trailers, are typically left unattended for long periods of time and as such are extremely vulnerable to theft. A trailer may be left hitched to a vehicle's hitch point in the vain hope that the extra effort required to unhitch the trailer would discourage a trailer thief. However, the extra effort to unhitch the trailer is not likely to be a deterrent to a determined trailer thief. An owner may adopt more extreme measures such as removing wheels to immobilize a trailer; while such efforts can meet with success in preventing a theft the owner is never-the-less seriously inconvenienced when he or she wants to use the wheelless trailer. Clearly there is a need for a more convenient way of protecting a trailer from theft.

There are trailer anti-theft devices on the market such as the Fulton™ trailer lock (part no. CSTP17) available from Fulton™, Mosinee, Wis. 54455-0008. However, such products are unable to protect trailers fitted with either ring or ball type hitches, which can present problems for trailer owners. For example, a trailer owner who replaces a trailer with a ball type hitch with a trailer with a ring type hitch may be obliged to buy an anti-theft device that fits the new trailer hitch. Thus, there is a need for an anti-theft device that can work with both types of hitches, i.e. a ball and/or ring type hitches.

Several efforts have been made to address these problems. U.S. Pat. No. 4,459,832, issued to Avrea et al on Jul. 17, 1984 describes a pivotally mounted coupling guard, extending over a ball engaging socket of a trailer hitch to preclude disengagement of the socket from the ball. On information and belief the '832 patent does not teach or suggest a dual anti-theft device suitable to prevent theft of a trailer with a ring hitch.

U.S. Pat. No. 6,467,317, issued to Hillabush et al. on Oct. 22, 2002 describes a lunette trailer hitch lock which prevents theft of trailers and other objects equipped with a lunette-style trailer coupler hitch having a lunette eye. The '317 patent does not teach or suggest an anti-theft device suitable to prevent theft of a trailer with either a ball or ring hitch.

U.S. Pat. Nos. 3,780,546, 3,844,143, 3,884,055, 4,186,575, 4,440,005, 4,480,450, 4,577,884, 4,581,908, 4,730,841, 4,774,823, 4,836,570, 5,063,759, 5,195,339, 5,332,251, 5,343,720, 5,743,549, 5,752,398, 5,775,139, 5,794,961, 5,873,271, 5,937,679, 6,070,441, 6,202,453, and 6,405,569 each describe anti-theft devices for trailers, but none of these patents teach or suggest a ball and ring hitch lock according to the present invention.

None of the above inventions and patents, taken either singly or in combination, is seen to describe the instant invention as claimed. Thus a ball and ring hitch lock solving the aforementioned problems is desired.

SUMMARY OF THE INVENTION

A ball and ring hitch lock to reversibly obstruct a ball socket or ring of a trailer hitch in order to prevent the theft of an unhitched trailer. The ball and ring hitch lock comprises an upper plate and a base plate. The upper plate has a lower surface, and a first and second opposite ends, with a post that extends in a normal direction from the lower surface of the upper plate. The post has a plurality of notches defined therein. The base plate has an upper surface and a sleeve with a hollow bore. The sleeve extends in a normal direction through the base plate and has a side opening defined therein. The sleeve is sized to accommodate the post extending from the upper plate. A lock mechanism is disposed in the base plate. The lock mechanism has at least one catch. When the lock mechanism is in a locked position the at least one catch extends into the side opening of the sleeve to engage at least one of the notches defined in the post in order to prevent removal of the base plate from the post. When the lock mechanism is in an unlocked position the at least one catch retracts from the sleeve in order to permit removal of the base plate from the post. A male hitch anchor is attached to the upper surface of the base plate. The male hitch anchor is sized to fit into a ball or a ring type hitch.

Accordingly, it is a principal object of the invention to provide an anti-theft device adapted to prevent the theft of an unhitched trailer.

It is another object of the invention to provide a ball and ring hitch lock to reversibly obstruct a ball socket or ring to prevent the theft of an unhitched trailer.

It is a further object of the invention to provide a robust ball and ring hitch lock comprising an upper plate, and a base plate combined with a lock mechanism adapted to engage at least one notch defined in a post extending from the upper plate in order to prevent separation of the base plate from the upper plate and visa versa.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
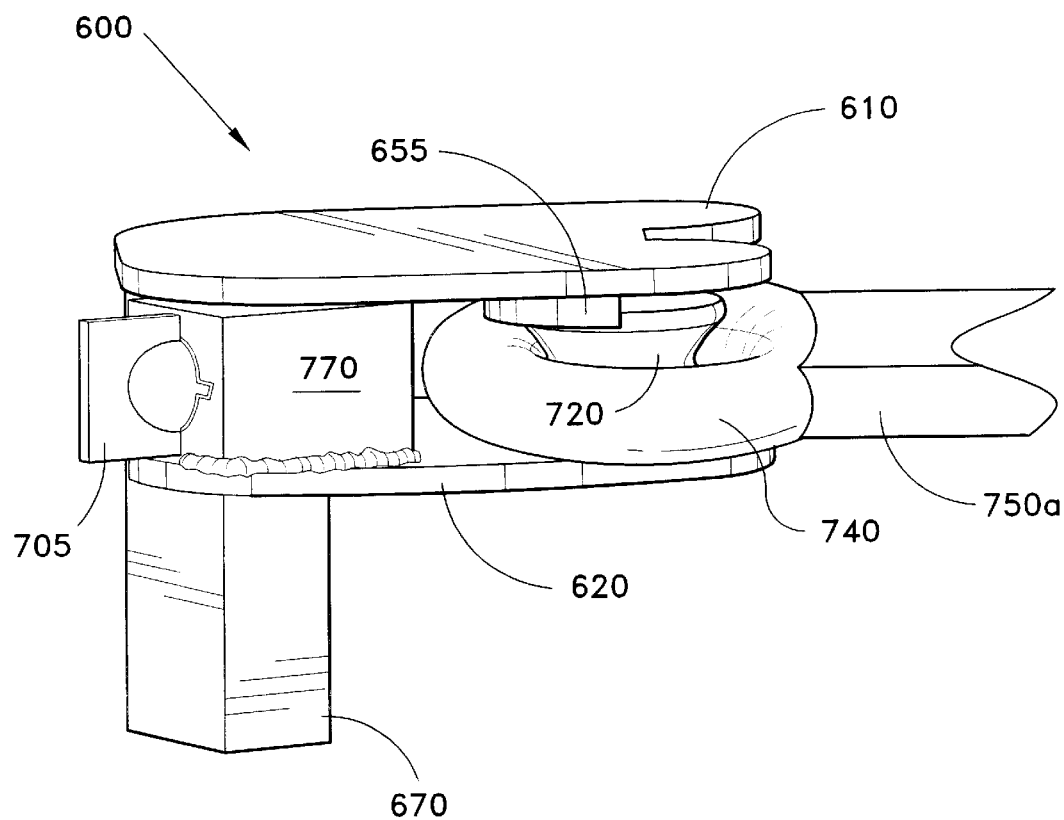
FIG. 1 is an environmental, perspective view of a ball and ring hitch lock hooked up to a ring type trailer hitch according to the invention.

The present invention is a ball and ring hitch lock to prevent unauthorized control and use of an unhitched trailer with either a ball or ring type hitch.

Referring to the figures generally, the ball and ring hitch lock 600 comprises an upper plate 610 and a base plate 620. The upper plate 610 comprises a lower surface 630 and a post 640 extending in a normal direction from the lower surface 630 of the upper plate 610. The post 640 has a plurality of notches 650 defined therein. The notches 650 may take the form of serrations or any other equivalent form. The upper plate 610 and a base plate 620 are preferably made of steel, but any material that is sufficiently durable may be used.

The base plate 620 comprises an upper surface 660 and a sleeve 670 with a hollow bore 680. In FIG. 1 the sleeve 670 extends in a normal direction through the base plate 620. A side opening 690 is defined in a side of the sleeve 670. The sleeve 670 is sized to accommodate the post 640. The base plate further comprises a lock mechanism housing 770. It will be understood that the sleeve 670 and the lock mechanism housing 770 may adopt various configurations.

Figure 6:
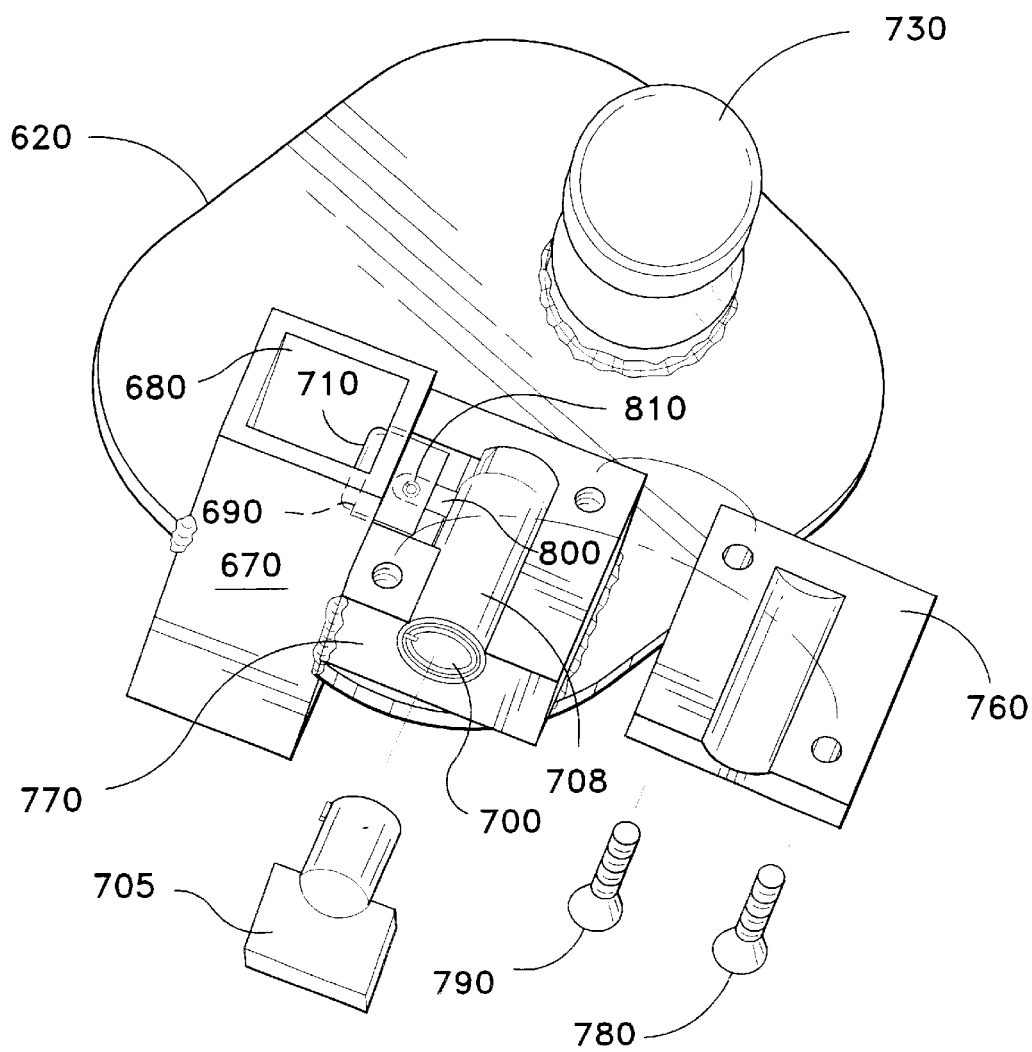
FIG. 6 shows an elevated perspective view of the ball and ring hitch lock illustrating one embodiment of the lock mechanism according to the invention.

The lock mechanism 700 has at least one catch 710 (see FIG. 6). The lock mechanism 700 has a locked position in which the at least one catch 710 extends into the side opening 690 of the sleeve 670 to engage at least one of the notches 650 defined in the post 640 in order to prevent removal of the base plate 620 from the post 640. In the unlocked position the at least one catch 710 is retracted from the sleeve 670 in order to permit removal of the base plate 620 from the post 640.

Figure 2:
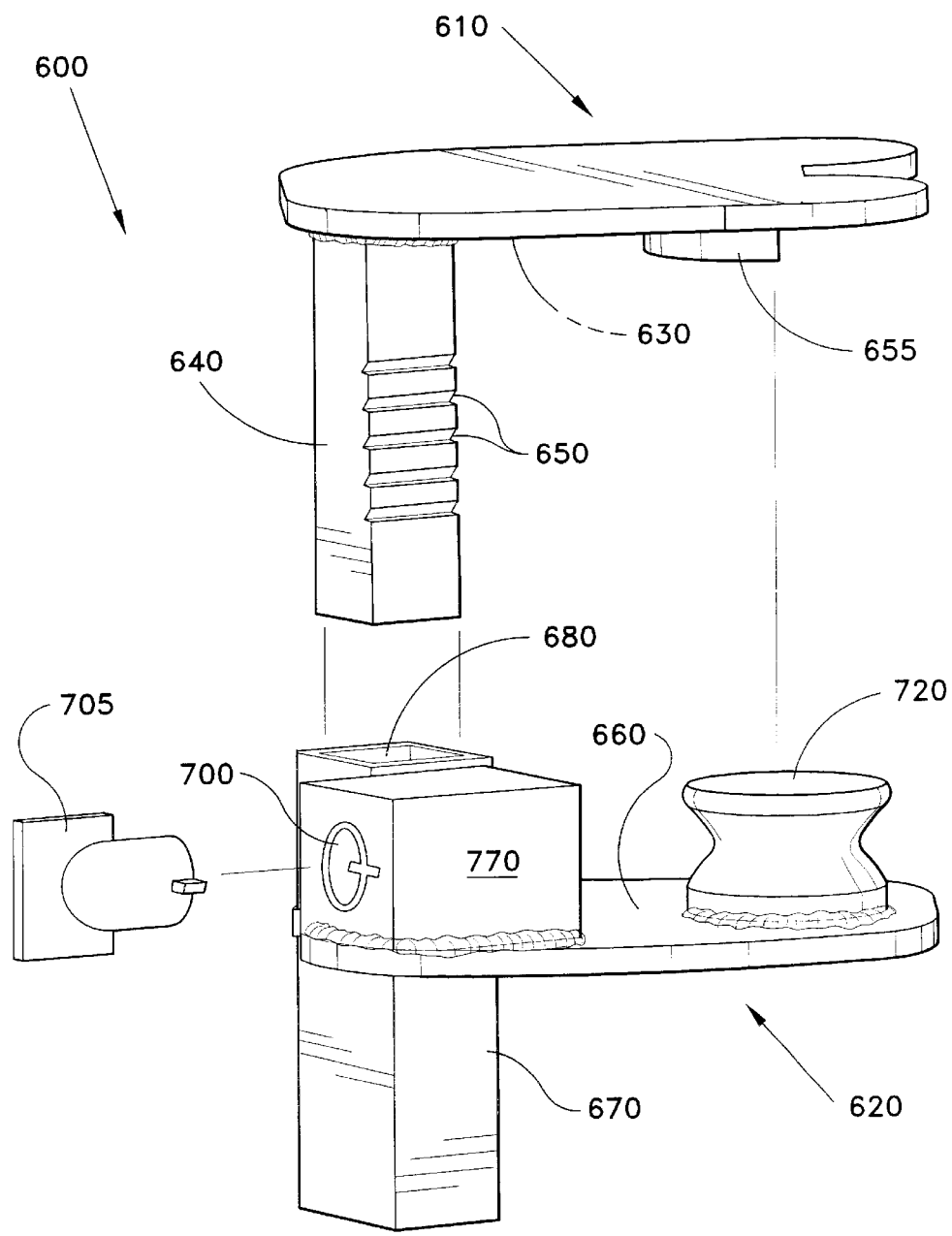
FIG. 2 shows a perspective view of the two main parts of the ball and ring hitch lock of FIG. 1.

Still referring to the figures in general, the base plate 620 further comprises a male hitch anchor 720 which is attached to the upper surface 660 of the base plate 620. The male hitch anchor 720 is sized to fit into a ring 750a or ball 750b type hitch. The male hitch anchor 720 can be of any suitable shape, e.g., the male hitch anchor 720 may have an hour glass shape as shown in FIG. 2. The upper plate may comprise an optional guide rib 655 to facilitate docking a ring 740 type hitch 750a to the ball and ring hitch lock 600. The invention includes other permutations that might be found in U.S. Provisional Patent Application Serial No. 60/363,272, filed Mar. 11, 2002. U.S. Provisional Patent Application Serial No. 60/363,272 is incorporated herein by reference in its entirety.

It is to be understood that the present invention covers any device having an upper plate 610 with a post 640 extending therefrom, such as a serrated or notched post, and a base plate 620 having a sleeve 670 adapted to accommodate the post 640 and a lock mechanism 700 adapted to reversibly engage the post 640 in the sleeve 670, wherein the sleeve 670 aligns the post 640, so that the lock mechanism 700 controls at least one catch 710 which engages the notches 650 or serrations to removably secure the upper plate 610 to the base plate 620 thereby enabling the device 600 to reversibly mate with a ball 750b or ring type hitch 750a.

Preferably the base plate cannot be removed from the post 640 without inserting a key 705 in the lock and rotating a key stock cylinder 708 (see FIG. 6). Preferably the lock mechanism 700 is spring biased and the notches 650 defined in the post 640 are configured so that when the key 705 is moved into the locked position, the base plate 620 will slide down the post 640, but is prevented from rising up the post 640, after the fashion of a ratchet.

Referring to the figures in more detail, FIG. 1 shows an environmental perspective view of the ball and ring hitch lock 600 according to the invention. The hitch lock 600 is shown mated with a ring type hitch 750a, i.e. a hitch with an eye or ring 740.

Figure 5:
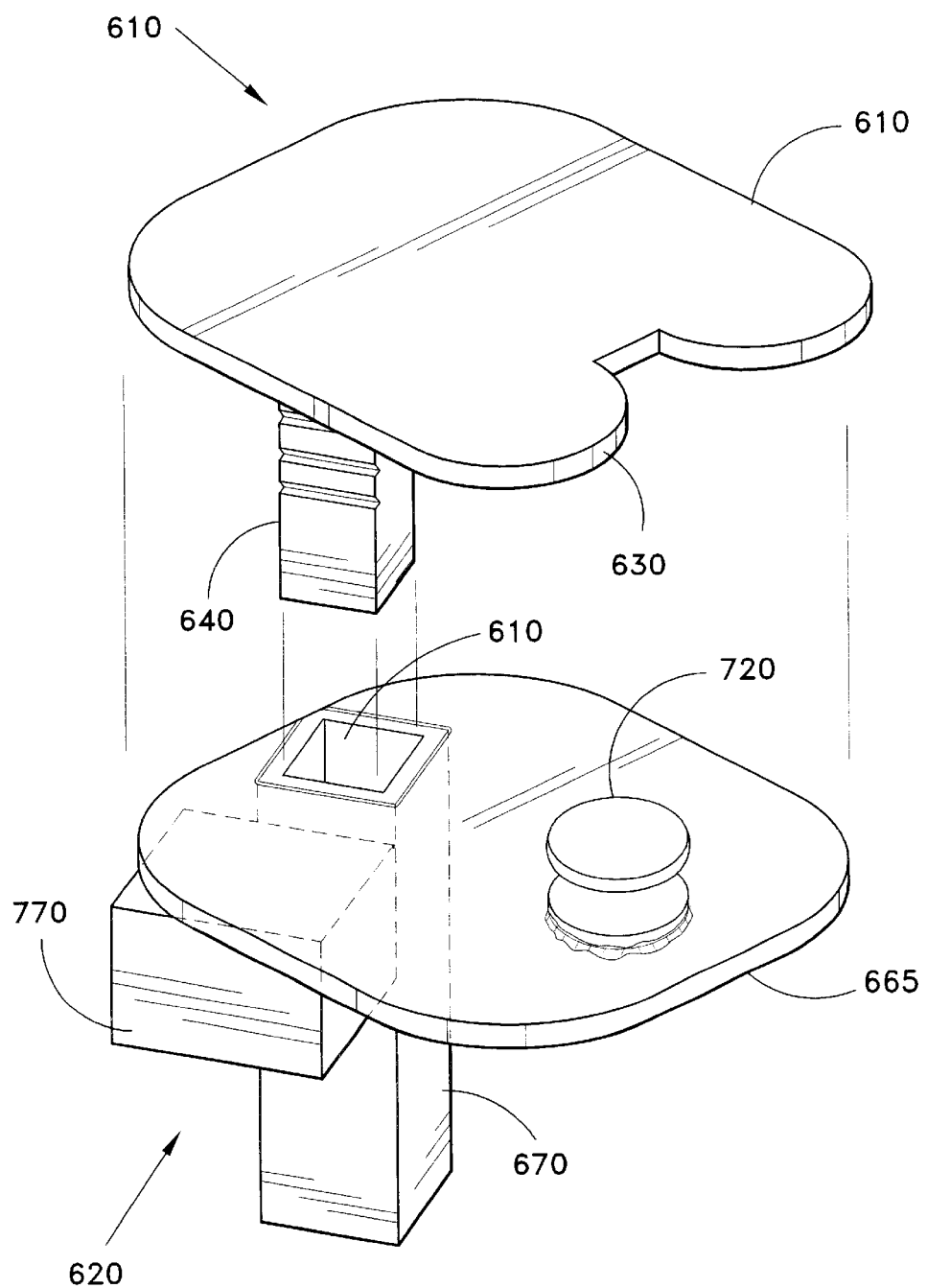
FIG. 5 shows a perspective view of the ball and ring hitch lock illustrating an alternative location of a sleeve in the base plate according to the invention.

FIG. 2 shows a perspective view of the two main parts of the ball and ring hitch lock 600 according to the invention,
i.e. the upper plate 610 and the base plate 620. It should be understood that the lock mechanism housing 770 can be attached to the lower surface 665 of the base plate 620. Also, the sleeve 670 may extend from the lower surface 665 of the base plate 620 as shown in FIG. 5. Thus, any suitable arrangement of the lock mechanism housing 770 and sleeve 670 will suffice providing that the lock mechanism 700 has a locked position in which the at least one catch 710 extends into the side opening 690 of the sleeve 670 to engage at least one of the notches 650 defined in the post 640 in order to prevent removal of the base plate 620 from the post 640.

Figure 3:
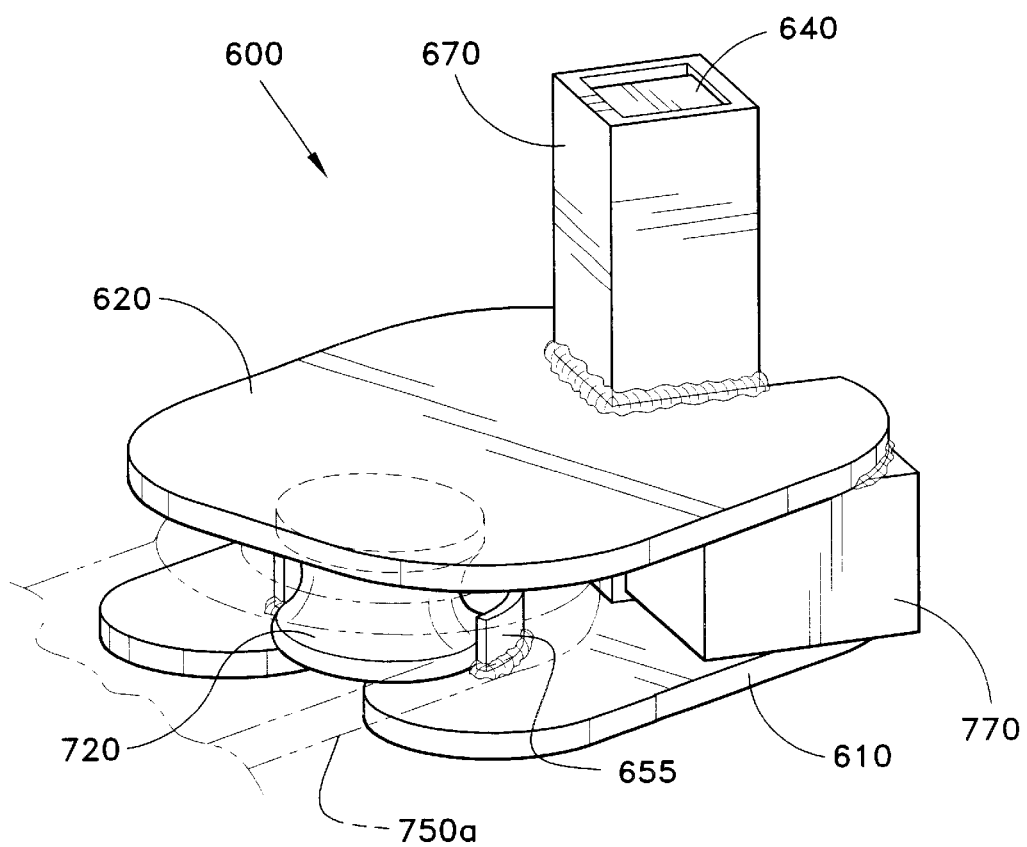
FIG. 3 shows a perspective environmental view of the ball and ring hitch lock reversibly hooked up to a ring type trailer hitch according to the invention.
Figure 4:
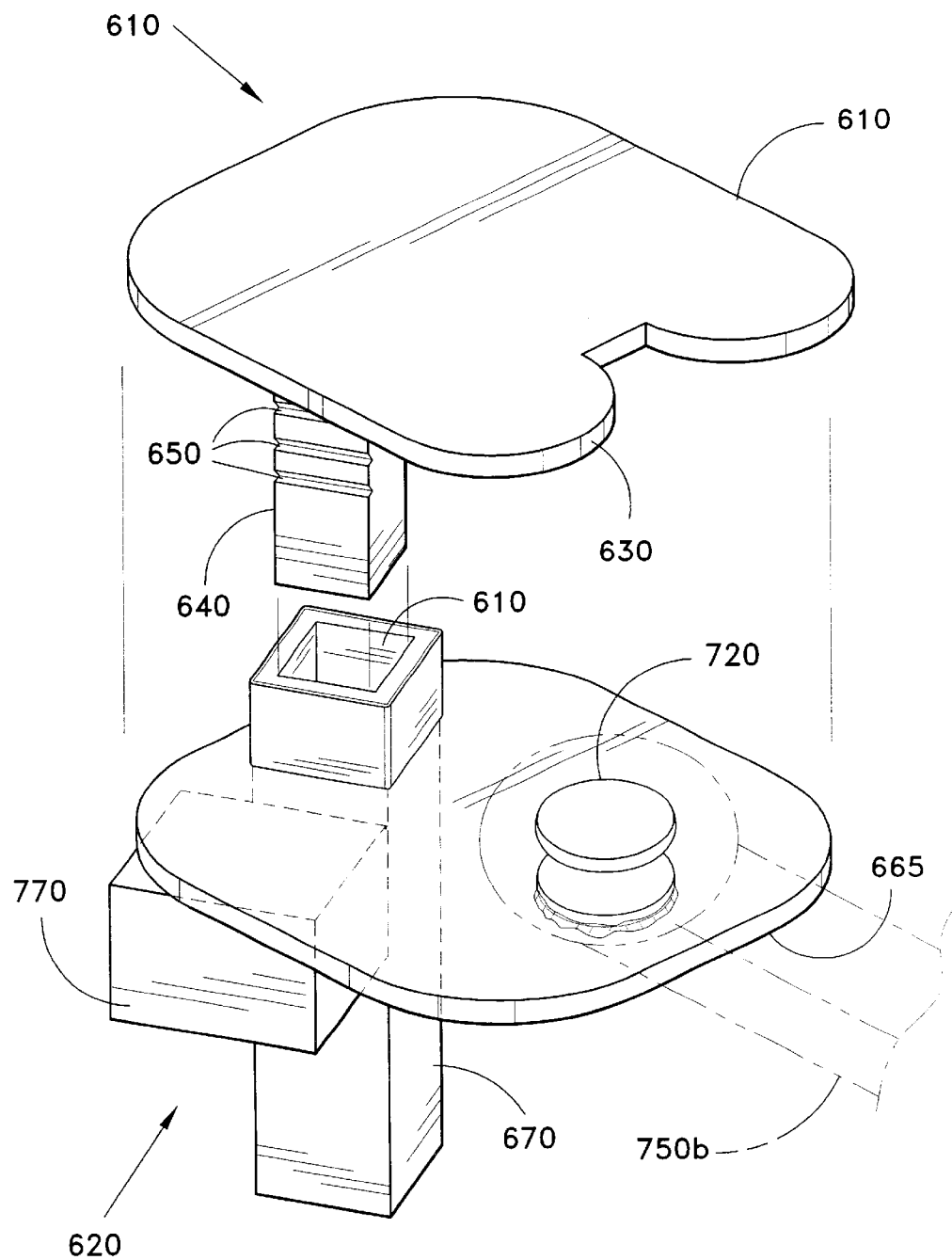
FIG. 4 shows a perspective view of the ball and ring hitch lock illustrating an alternative location of a lock mechanism in the base plate according to the invention.

Referring to FIGS. 3 and 4, FIG. 3 shows a perspective environmental view of the ball and ring hitch lock 600 installed in an alternative method to a hitch with a ring 750a. FIG. 4 shows an alternative embodiment of the invention wherein the lock mechanism housing 770 is attached to the lower surface 665 of the base plate 620.

FIG. 5 shows yet another variation in the arrangement of the lock mechanism housing 770 and the sleeve 670. The lock mechanism housing 770 is attached to the lower surface 665 of the base plate 620 while the sleeve 670 terminates at, and is flush with, the top surface 660 of the base plate 620.

FIG. 6 shows an elevated perspective view of the base plate 620 with a cover 760 of the lock mechanism housing 770 removed exposing the key stock cylinder 708. The cover 760 forms part of the lock mechanism housing 770. The cover 760 is fastened to the lock mechanism housing 770 using fasteners such as security hex screws 780 and 790. A twist motion by the key 705 causes a lock pin 800 to move at least one catch 690 into the sleeve 670 via a side opening 690 in the sleeve and thereby engage the notches 650 in the post 640. A fastener such as a spring pin 810 attaches the lock pin 800 to the at least one catch 690.

It will be understood that the present invention is not limited to the embodiments described above, but encompasses any and all embodiments within the scope of the following claims. In particular, it will be understood that the scope of the present invention extends to any lock mechanism having an upper plate with a post extending therefrom, such as a serrated or notched post, and a base plate having a sleeve adapted to accommodate the post and a lock mechanism adapted to reversibly engage the post in the sleeve, wherein the sleeve aligns the post, so that the lock mechanism controls a catch which engages the notches or serrations to removably secure the upper plate to the base plate thereby enabling the device to reversibly mate with a ring or ball hitch.

I claim:

1. A ball and ring hitch lock to reversibly obstruct a ball socket or ring of a trailer hitch in order to prevent the theft of the trailer when left unhitched, comprising:
    (a) an upper plate having:
        a lower surface;
        a post extending in a normal direction from the lower surface of the upper plate, the post having a plurality of notches defined therein; and
    (b) a base plate having:
        an upper surface;
        a sleeve with a hollow bore, wherein the sleeve extends in a normal direction through the base plate, the sleeve having a side opening defined therein, wherein the sleeve is sized to accommodate the post extending from the upper plate; and
        a lock mechanism disposed on the base plate, the lock mechanism having at least one catch, the lock mechanism having a locked position in which the at least one catch extends into the side opening of the sleeve to engage at least one of the notches defined in the post in order to prevent removal of the base plate from the post, and an unlocked position in which the at least one catch retracts from the sleeve in order to permit removal of the base plate from the post; and a male hitch anchor attached to the upper surface of the base plate, wherein the male hitch anchor is sized to fit into a ball or a ring type hitch.

2. A ball and ring hitch lock according to claim 1, wherein the lock mechanism is attached to the upper surface of the base plate.

3. A ball and ring hitch lock according to claim 1, wherein the base plate has a lower surface and the lock mechanism is attached to the lower surface of the base plate.

4. A ball and ring hitch lock according to claim 1, wherein the upper plate and the base plate are made of steel.

5. A ball and ring hitch lock according to claim 1, wherein the notches take the form of serrations.

6. A ball and ring hitch lock according to claim 1, wherein the upper plate further comprises a guide rib to facilitate docking of a ring type hitch to the ball and ring hitch lock.

7. A ball and ring hitch lock to reversibly obstruct a ball socket or ring of a trailer hitch in order to prevent the theft of the trailer when left unhitched, comprising:

(a) an upper plate having:
an upper surface, a lower surface, and a first and second opposite ends;
a post extending in a normal direction from the lower surface of the first end of the upper plate, the post having a plurality of notches defined therein; and (b) a base plate having:
an upper surface, a lower surface, a first and second opposite ends;
a sleeve having a top and bottom defining a hollow bore, wherein the sleeve extends in a normal direction through the base plate, the sleeve having a side opening defined therein, wherein the top of the sleeve is open and sized to accommodate the post extending from the upper plate; and a lock mechanism disposed on the base plate, the lock mechanism having at least one catch, the lock mechanism having a locked position in which the at least one catch extends into the side opening of the sleeve to engage at least one of the notches defined in the post in order to prevent removal of the base plate from the post, and an unlocked position in which the at least one catch retracts from the sleeve in order to permit removal of the base plate from the post; and a male hitch anchor attached to the upper surface of second end of the base plate, wherein the male hitch anchor is sized to fit into a ball or a ring type hitch.

8. A ball and ring hitch lock according to claim 7, wherein the upper plate and the base plate are made of steel.

9. A ball and ring hitch lock according to claim 7, wherein the notches take the form of serrations.

10. A ball and ring hitch lock according to claim 7, wherein the upper plate further comprises a guide rib to facilitate docking of a ring type hitch to the ball and ring hitch lock.

* * * * *